United States Patent
Phipps et al.

(10) Patent No.: US 9,549,582 B2
(45) Date of Patent: *Jan. 24, 2017

(54) PROTECTIVE HELMET

(71) Applicants: Emerson Spalding Phipps, Dallas, TX (US); Charles Edward Phipps, Dallas, TX (US)

(72) Inventors: Emerson Spalding Phipps, Dallas, TX (US); Charles Edward Phipps, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/721,158

(22) Filed: May 26, 2015

(65) Prior Publication Data
US 2015/0250246 A1    Sep. 10, 2015

Related U.S. Application Data

(63) Continuation of application No. 13/792,812, filed on Mar. 11, 2013, now Pat. No. 9,089,180, which is a continuation-in-part of application No. 13/227,901, filed on Sep. 8, 2011, now Pat. No. 9,439,469.

(51) Int. Cl.
| | |
|---|---|
| *A42B 3/12* | (2006.01) |
| *A42B 3/00* | (2006.01) |
| *A42B 3/06* | (2006.01) |
| *A42B 3/04* | (2006.01) |
| *A42B 3/08* | (2006.01) |
| *A42B 3/30* | (2006.01) |
| *A47C 23/00* | (2006.01) |
| *B60N 2/42* | (2006.01) |

(Continued)

(52) U.S. Cl.
CPC ............ *A42B 3/00* (2013.01); *A42B 3/044* (2013.01); *A42B 3/064* (2013.01); *A42B 3/08* (2013.01); *A42B 3/12* (2013.01); *A42B 3/30* (2013.01); *A47C 23/00* (2013.01); *B60N 2/42* (2013.01); *B60R 19/28* (2013.01)

(58) Field of Classification Search
CPC ............ A42B 3/12; A42B 3/064; A42B 3/00; A42B 3/0406; A63B 71/10
See application file for complete search history.

(56) References Cited

U.S. PATENT DOCUMENTS 4,287,613 A * 9/1981 Schulz .................. A42B 3/145
2/413
5,035,009 A * 7/1991 Wingo, Jr. ............ A42B 3/121
2/414

(Continued)

*Primary Examiner* — Bobby Muromoto, Jr.
(74) *Attorney, Agent, or Firm* — Locke Lord, LLP

(57) ABSTRACT

A protective member such as a helmet includes an outer layer and an inner layer interconnected by multiple connectors, such as extension springs, under tension along their longitudinal axis. The connectors absorb energy from an impact force by resisting further tension along their longitudinal axis and allow the outer layer and inner layer to move relative to each other. In the helmet application, the head of a user experiences less impact force, reduced change in momentum or position of the head and neck, reduced head and neck loads and reduced amounts of linear and rotational acceleration. The protective member can be used in numerous applications and environments, including for participants in sports, in applications including bumpers, passenger cabins, car seats and beds.

16 Claims, 6 Drawing Sheets

(51) Int. Cl.
 *B60R 19/28* (2006.01)
 *A63B 71/10* (2006.01)

(56) References Cited

U.S. PATENT DOCUMENTS

| | | | | |
|---|---|---|---|---|
| 5,101,517 A * | 4/1992 | Douglas | ............ | A42B 3/20 2/424 |
| 5,142,700 A * | 8/1992 | Reed | ............ | A42B 3/30 2/422 |
| 5,204,998 A * | 4/1993 | Liu | ............ | A42B 3/121 2/411 |
| 5,263,203 A * | 11/1993 | Kraemer | ............ | A42B 3/122 2/413 |
| 6,272,692 B1 * | 8/2001 | Abraham | ............ | A42B 3/063 2/411 |
| 6,826,509 B2 * | 11/2004 | Crisco, III | ............ | A42B 3/046 2/422 |
| 7,328,462 B1 * | 2/2008 | Straus | ............ | A42B 3/067 2/411 |
| 7,526,389 B2 * | 4/2009 | Greenwald | ............ | A42B 3/046 2/425 |
| 7,954,177 B2 * | 6/2011 | Ide | ............ | A42B 3/08 2/425 |
| 8,296,867 B2 * | 10/2012 | Rudd | ............ | A42B 3/062 2/410 |
| 9,089,180 B2 * | 7/2015 | Phipps | ............ | A42B 3/12 |
| 2003/0160466 A1 * | 8/2003 | Bladow | ............ | B60R 19/18 293/155 |
| 2005/0050617 A1 * | 3/2005 | Moore, III | ............ | A42B 3/12 2/410 |
| 2006/0059606 A1 * | 3/2006 | Ferrara | ............ | A01N 25/18 2/412 |
| 2008/0256686 A1 * | 10/2008 | Ferrara | ............ | A41D 13/0155 2/413 |
| 2010/0101005 A1 * | 4/2010 | Cripton | ............ | A42B 3/064 2/411 |
| 2011/0035118 A1 * | 2/2011 | Hiemenz | ............ | B60N 2/4242 701/45 |

* cited by examiner

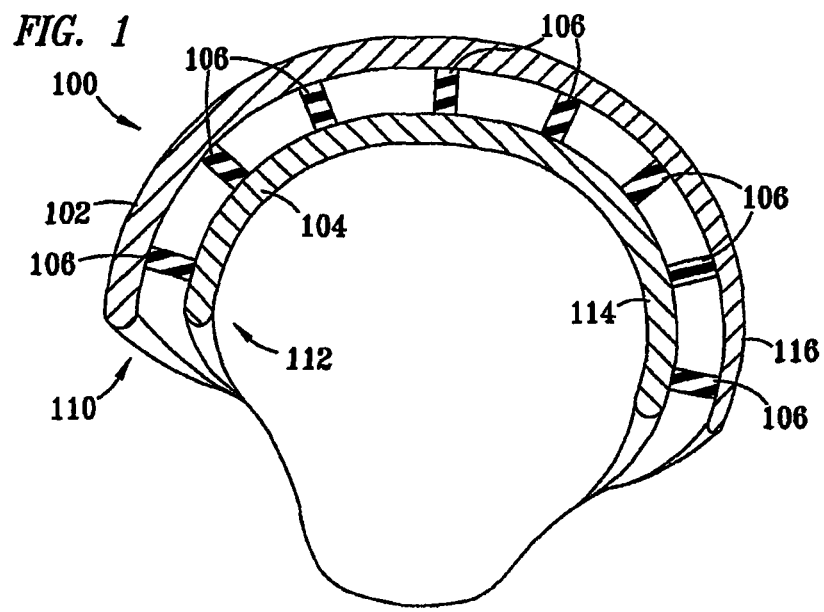
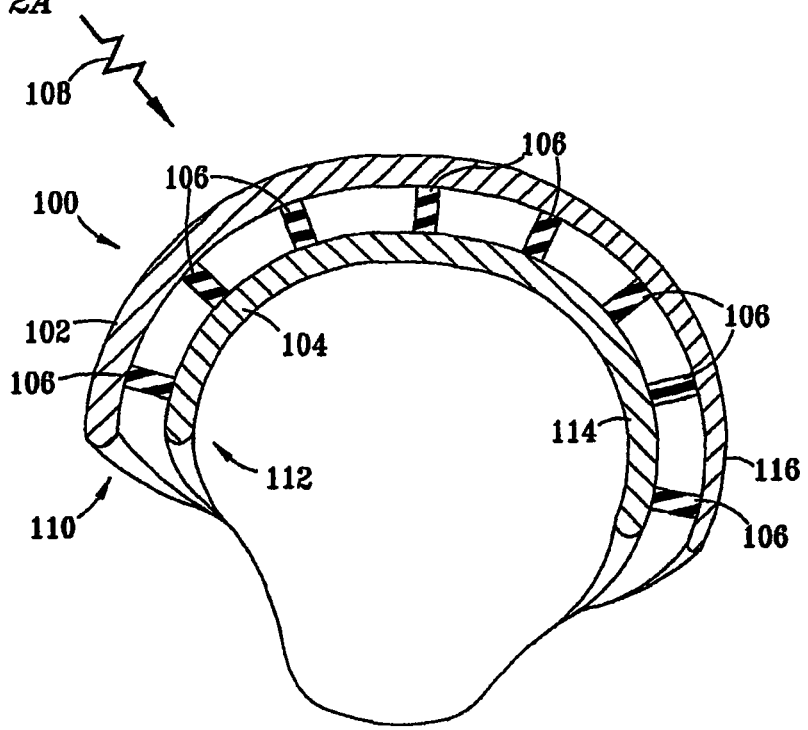

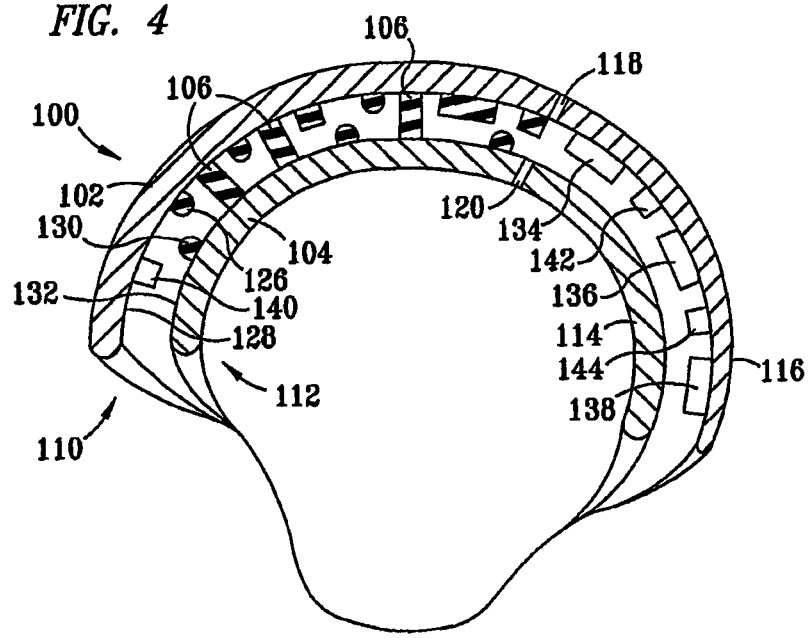
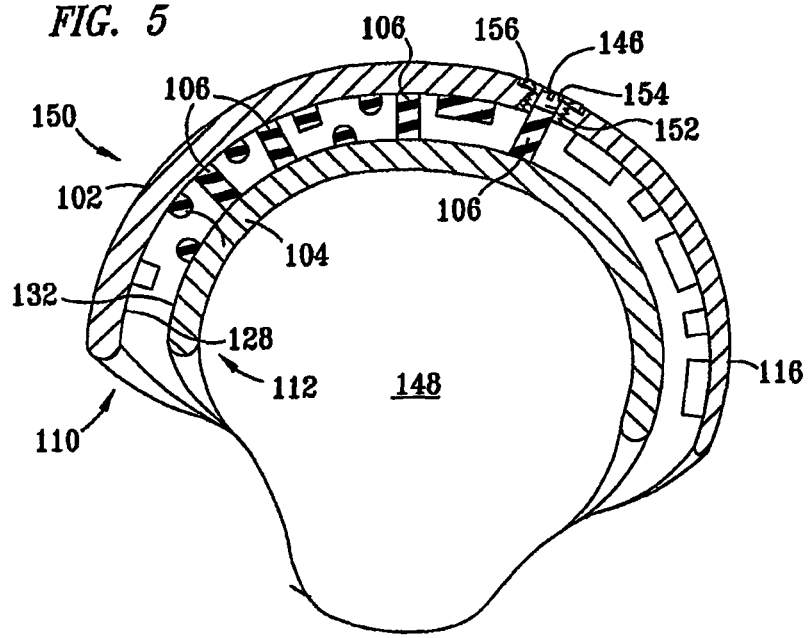

PROTECTIVE HELMET

RELATED APPLICATIONS

This is a continuation of a continuation-in-part application filed on Mar. 11, 2013 as U.S. application Ser. No. 13/792,812 that claims the benefit of the priority date of U.S. application Ser. No. 13/227,901 filed Sep. 8, 2011 which is hereby incorporated by reference.

TECHNICAL FIELD OF THE INVENTION

The present invention generally relates to protective members such as helmets and more particularly to helmets comprising extension springs that can absorb, at least in part, an impact force.

BACKGROUND OF THE INVENTION

Protective members such as helmets have been worn to protect a user from head injuries. Protective helmets have been used for many endeavors, including for participants in sports (e.g., football, baseball, lacrosse, racing, skiing), for commercial activities (e.g., construction) and for military personnel (e.g., pilots, soldiers). Prior art helmets have generally comprised a single layer which is rigidly secured to the head of a user.

U.S. Pat. No. 4,287,613, entitled "Headgear With Energy Absorbing and Sizing Means" disclosed a headgear of the type used by football players. The headgear included a web suspension means comprising looped straps held together by a cord that threads through the looped straps and is knotted. The web suspension means performed a sizing function and maintained the top of the wearer's head out of contact with the upper wall of the helmet shell. The ends of the straps were connected to an encircling band that was fastened at selected locations to the helmet shell.

U.S. Pat. No. 5,035,009, entitled "Protective Helmet and Liner" disclosed a protective helmet having a sheet of sound deadening material between impact force absorbing pad structures disposed on the interior of the protective helmet.

Recent advances in helmets include U.S. Pat. No. 6,826,509, entitled "System And Method For Measuring The Linear And Rotational Acceleration Of A Body Part." The '509 patent discloses a system using accelerometers to collect, record and process head acceleration data. See FIG. 7 of the '509 patent. See also the related U.S. Pat. No. 7,526,389.

U.S. Pat. No. 7,954,177 entitled "Sports Helmet" disclosed a sports helmet having ear flaps and jaw flaps.

SUMMARY OF THE INVENTION

A protective member such as a helmet includes an outer layer and an inner layer interconnected by multiple connectors, such as extension springs, under tension along their longitudinal axis. The connectors absorb energy from an impact force by resisting further tension along their longitudinal axis and allow the outer layer and inner layer to move relative to each other. In protecting the head of a user, the helmet reduces the amount of impact force experienced, reduces the change in momentum or position of the head and neck, reduces head and neck loads and reduces the amount of linear and rotational acceleration. The protective member can be used in numerous applications and environments, including for participants in sports, in applications including bumpers, passenger cabins, car seats and beds.

BRIEF DESCRIPTION OF THE DRAWINGS

For a more complete understanding of the invention and for further advantages thereof, reference is now made to the following Description of the Preferred Embodiments taken in conjunction with the accompanying Drawings in which:

FIG. 1 is a cross-sectional view of a protective helmet according to the present invention.

FIGS. 2A-2B depicts the relative orientations of the layers of the protective helmet of the present invention before, during and after an impact with an object.

FIG. 4 is a cross-sectional view of a protective helmet according to the present invention depicting additional components and features.

FIG. 5 is a cross-sectional view of a protective helmet according to the present invention depicting an adjustor to adjust the connectors.

DESCRIPTION OF THE PREFERRED EMBODIMENTS

Figure 2B:
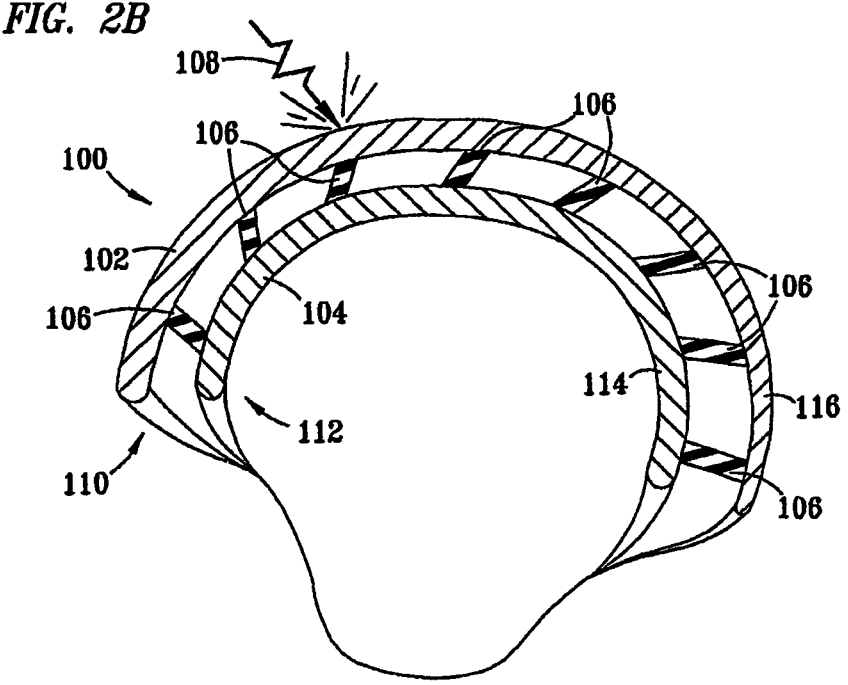

The following detailed description of the preferred embodiments should be read in view of the FIGS. in which the same reference numerals are used to refer to the same or corresponding components of the novel protective helmet of the invention.

As shown in FIG. 1, the novel protective helmet 100, includes an outer layer 102, an inner layer 104 and multiple intermediate connectors 106. The multiple intermediate connectors 106 connect inner layer 104 to outer layer 102. Connectors 106 preferably connect outer layer 102 to inner layer 104 such that each connector 106 is under tension along its longitudinal axis. The protective helmet 100 can further include other connectors 106 that are not under such tension. Each of inner layer 104 and outer layer 102 may, in certain embodiments, be referred to individually as a shell.

As shown in FIGS. 2A-2B, the multiple intermediate connectors 106 are deformable so as to allow relative movement between inner layer 104 and outer layer 102. Protective helmet 100 in a state of rest may exist as shown in FIG. 2A prior to encountering a force 108.

As shown in FIGS. 2A-2B, force 108 is an external force that is less than the amount of force needed to move the head of a user that is in a relatively fixed position. This amount of force may be considered a "low impact" external force.

Force 108, however, could also be an internal force exerted by the head of a user. In the case of a low impact external force 108, upon the exertion of the external force 108, the front portion 110 of outer layer 102 is impacted. As a result, the force 108 is transferred to outer layer 102 and deforms at least some of the connectors 106. The distance between the front portion 110 of outer layer 102 and the front portion 112 of inner layer 104 may be reduced as shown in FIG. 2B. To absorb the force 108, the connectors 106 connecting the rear portion 114 of inner layer 104 and the rear portion 116 of outer layer 102 are stretched generally along their longitudinal axis. By resisting further tension along their longitudinal axis, these connectors 106 serve to absorb the force 108. In addition, the connectors 106 connecting the front portion 110 and the front portion 112 may be compressed. Thus, the connectors 106 absorb forces and/or resist deformation. Preferably, connectors 106 are also elastic in that, after an impact, they seek to regain their shape and/or orientation to their original position prior to the exertion of a force 108. Preferably, this reversal occurs quickly. After an impact, inner layer 104 and outer layer 102 return to their original relative orientation as shown in FIG. 2A.

In one preferred embodiment, all of the connectors 106 are under tension such that they are further stretched as a result of an impact occurring on the opposite side of the helmet 100. The connectors 106 therefore do not serve to absorb forces through compression along their longitudinal axis; rather, they resist further tension or stretching generally along their longitudinal axis. Thus, connectors 106 absorb energy from an impact force 108 by resisting further tension along their longitudinal axis, generally on the opposite side of the protective helmet 100 than the side of impact. Thus, the connectors 106 allow the outer layer 102 and the inner layer 104 to move relative to each other so as to reduce the amount of force from an impact that is transferred to the head of a user and/or the amount of force from the head of a user that is transferred to the environment surrounding protective helmet 100.

An "equal" force 108 is an amount of force needed to equal the resistance-to-change in the position of the head of a user in a fixed position or to counter the momentum of the head of a user in motion. A "high impact" force 108 is an amount of force needed to change the position of the head of a user in a fixed position or to exceed the momentum of the head of a user in motion.

Protective helmet 100 reduces the amount of movement of the head and neck of a user that would otherwise occur. Protective helmet 100 can reduce the amount of a force 108 that is transferred to the head and neck of a user. Protective helmet 100 can afford a reduction in the amount of force transferred from the helmet to another object, such as another helmet. The multiple connectors 106 absorb energy from an impact with force 108 caused by another object and allow outer layer 102 to move relative to inner layer 104 so as to reduce the amount of force from said impact that is transferred to the head and neck of a user. In addition, the movement of outer layer 102 relative to inner layer 104 reduces the amount of movement, including rotational movement, of the head and neck of a user that would otherwise occur from an impact. Likewise, the force of the head of a user in motion that is transferred to another object is reduced by the relative movement of inner layer 104 to outer layer 102.

The afforded reduction in the transfer of force is beneficial in reducing head and neck injuries. In addition, the afforded reduction in relative movement and/or the change in momentum of the head of the user is beneficial in reducing head and neck injuries. The reduction of the amount of change in position and/or of momentum of the head of the user afforded by the present novel protective helmet 100 is a significant advantage over prior art helmets. If the head of the user is at rest relative to its surrounding environment, it is considered to have no momentum. Thus, an impact with an object exerting force 108 may change the position of the head of the user. If the head of the user is in motion relative to its surrounding environment (e.g. a football field), then it has momentum. Thus, an impact with an object exerting force 108 may change the momentum of the head of a user. Protective helmet 100 affords a reduction in the amount of change in position of the head of a user at rest that would otherwise occur as a result of an impact with an object exerting a force 108. Protective helmet 100 affords a reduction in the amount of a change in momentum that the head of a user in motion would otherwise experience as a result of an impact with an object exerting a force 108.

In the event that the outer layer 102 is in a fixed position, such as possibly for a race car driver, protective helmet 100 would still afford a reduction in the amount of force and or change in momentum that would occur in the absence of protective helmet 100 in view of the movement of inner layer 104 relative to outer layer 102 and the response of connectors 106 to a force 108, whether it be a force external to protective helmet 100 or an internal force caused by the head of a user or a combination thereof.

Force 108 is not part of the novel protective helmet 100. Force 108 could be any object, such as another helmet; or in a commercial environment could be a falling object; or in the case of a military environment could be a bullet or other projectile.

Outer layer 102 may absorb some of the impact of a force 108. Connectors 106 may absorb some of the impact of a force 108. Inner layer 104 may absorb some of the impact of a force 108. Preferably, the impact energy of force 108 is absorbed by the protective helmet 100 so that no amount of the force is transferred to the head of a user. A "reduction" in force includes reducing it to zero.

Connectors 106 can be any material that absorbs forces, such as rubber or springs. Connectors may be of different lengths and thicknesses. Connectors 106 can vary along their length as to the type of material and/or the amount of retention force or force absorption. Connectors 106 can have different cross-sectional shapes, e.g., circular. The cross-section of the connectors 106 can also vary along the length of the connector 106. Connectors 106 can be of different lengths. Connectors 106 can be forked or pronged at one or both ends. Connectors 106 can be intertwined. Connectors 106 can be tubular. Connectors 106 can be of different angles of attachment, including different angles at each connecting end relative to the inner layer 104 and to the outer layer 102. For example, connectors 106 can be connected perpendicular to the surface of outer layer 102 or inner layer 104 or can connect to such layers at an angle. Such angles could be measured relative to a tangent line intersecting the point of a connector 106 at which it is connected to either outer layer 102 or inner layer 104.

Figure 6:
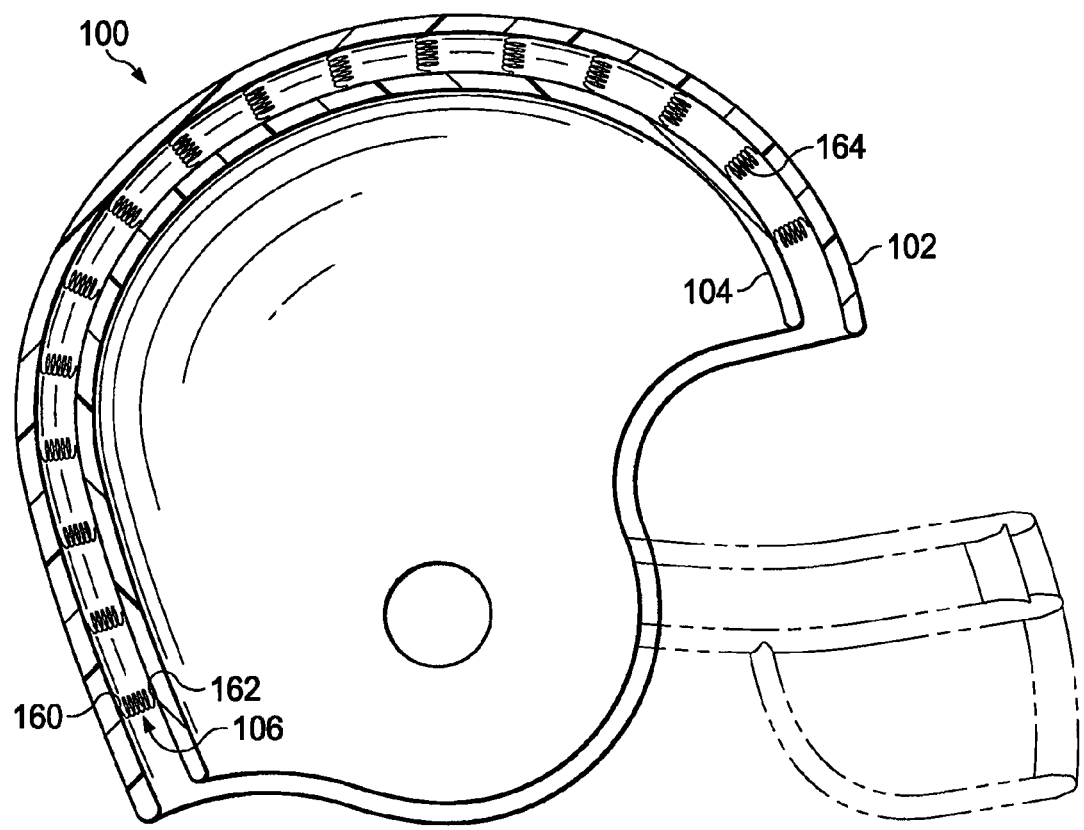
FIG. 6 is a cross-sectional view of a protective helmet according to the present invention depicting the connectors as extension springs.

As shown in FIG. 6, Connectors 106 can be comprised of extension springs. The extension springs oppose further extension. When the layers 104 and 102 move apart, the extension spring 106 attempts to bring them closer together again. Extension springs absorb and store energy and create a resistance to a pulling force. They can provide a return force. A protective helmet for protecting the head or body of a user can comprise an outer layer 102, an inner layer 104 connected to outer layer 102 by multiple connectors 106 wherein each connector has a longitudinal axis and comprises an extension spring being under tension along its longitudinal axis. The protective helmet 100 allows the extension springs 106 to absorb energy from an impact force by resisting further tension along the longitudinal axis of one or more of the extension springs. Moreover, the configuration of protective helmet 100 allows the outer layer 102 and the inner layer 104 to move relative to each other and reduce the amount of force from said impact that is transferred to the head or body of a user. The extension springs can be attached at a first end 160 to the outer layer 102 and at a second end 162 to the inner layer 104. One or more of the ends 160 and 162 can be adjustably, removably, pivotally and or rigidly attached. Adjustment of tension can be performed using any appropriate mechanisms, such as a guitar-string adjustment mechanism.

The springs can have hooks, eyes, or other interface geometry at the ends to attach to the layers 102 and 104. The springs can be made of any suitable material, including music wire, oil tempered chrome silicon, or stainless steel. Spring design features involve considerations of outer diameter, inner diameter, wire diameter, free length and extended length. The free length is the overall length of a spring in the unloaded position. The extended length is the length at full rated extension. The spring rate is the force per unit spring deflection. The maximum load is the load at full extension. Preferably, the extension springs have initial tension. The measure of the initial tension is the load necessary to overcome the internal force and to begin coil separation. Thus, unlike a compression spring, which has zero load at zero deflection, an extension spring can have a preload at zero deflection. This built-in load, called initial tension, can be varied.

Preferably, connectors 106 are extension springs that connect outer layer 102 to inner layer 104 such that the connectors in a rest position have already exceeded their initial tension. The initial load tension can be referred to as an initial force, F1 or Force 1. Initial load tension is the amount of tension required to begin coil separation. Thus, in a preferred configuration, connectors 106 are connected such that they are loaded under a second force (F2 or Force 2) that exceeds F1. During engagement of the helmet, the connectors 106 preferably do not exceed a force maximum, Force Maximum or FM. Thus, F2 is greater than F1 but less than FM. As the helmet 100 receives a force of impact (FI), the impact force is absorbed by increasing the force on certain springs to be greater than F2 and preferably does not become so great that it exceeds FM. The impact force is absorbed by connector springs 106 generally on the opposite side of helmet 100 than the side that received the impact. Thus, FI is distributed around outer layer 102 and absorbed by connectors 106 generally disposed on the opposite side of the impact area. For connectors closest to the impact zone, the load tension may actually decrease such that the force on those extension springs becomes less than F2 but preferable not less than F1. Inner layer may therefore be allowed to move or continue moving toward the direction of impact which allows for a reduction in head deceleration that would otherwise occur. As the impact force is removed, the extension springs regain their original orientation such that the springs return to F2. Likewise, outer layer 102 and inner layer 104 return to their original orientation. Preferably, the springs that absorbed the force go from FM or less back down to F2 and the springs that did not absorb the force go from F1 or there above back up to F2. Helmet 100 is thus ready to absorb another impact force.

A drawbar or its equivalent may be included to take effect at or before the moment when the impact force that is experienced by a given connecter reaches FM. Thus, connectors 106 can be or can include one or more drawbar springs or its equivalent. In some drawbar springs, the load is applied at the ends of long loops that pass through the spring's center and are hooked around the opposite end, thus compressing the spring upon loading. Drawbar springs are used in potential overload situations and offer a built-in definite stop that will continue to carry a static load after reaching the maximum extended length. In the present invention, the built-in stop could also be accomplished via other design features including the padding member 126 and or padding member 130.

Protective helmet can also be used in other applications. In one embodiment, the helmet is cylindrical. In this embodiment, the protective device can be used in numerous applications, including as goal posts, protective members (e.g. for ski lift poles) or can be used in body armor. In the body armor embodiment, outer layer 102 and inner layer 104 are designed to generally conform to the body of a user. In such an embodiment, inner layer 104 can be a rigid matrix affixed to the body of a user. In a commercial application, such as for a motor vehicle, helmet 100 can be used as a bumper wherein outer layer 102 surrounds the vehicle or car and inner layer 104 is affixed to the vehicle; thus allowing connectors 106 to absorb impact forces and allow passengers or cargo to decelerate at a lower rate so as to minimize injuries. Helmet 100 can also be used in a motor vehicles such that the passenger cabin is surrounded by inner layer 104 and outer layer 102 is affixed to the vehicle. In certain applications, in may be desirable to have a protective helmet 100 in the bumper application and another protective helmet in the passenger cabin application, which would afford additional safety to passengers and cargo. In another embodiment, inner layer can be secured around an axle or other rotatable member and outer layer 102 can be in direct or indirect ground contact so as to absorb road impacts.

Connectors 106 can have different shapes, be made of various materials and can serve numerous functions. In one embodiment, connectors 106 are cylindrical. Connectors 106 can be of solid material or hollow (e.g., the same material used in resistance tubes). Connectors 106 can also be configured to be replaceable. Hollow connectors can include internal connectors 106 that can in turn be solid or hollow. In one embodiment, the inner connector can be under a different amount of tension than the outer surrounding connector. For example: an inner connector can be under less or no tension but can have a higher resistance to deformation; whereas, the outer connector can be under greater tension, but can afford a lesser amount of resistance to deformation; or vice versa. Connectors 106 can also serve different functions, including the use of some connectors 106 to offset the force of gravity on outer surface 102 so as to maintain the optimum relative orientations between outer layer 102 and inner layer 104. Connectors 106 can also be subdivided into sets of connectors, each set having its own function, shape, orientation and or type of material. In one embodiment, there are three sets of connectors, a first set serving to absorb low impact forces, a second set serving to absorb essentially equal forces and a third set serving to absorb high impact forces. In one embodiment, connectors 106 are disposed in lines parallel to the expected angle of impact on opposite sides of protective helmet 100, preferably along the same line as the angle of approach of force 108.

Connectors 106 can serve to reduce the amount of multiple forces 108, including an external force 108 that impacts outer layer 102 and an internal force 108 caused by the head of a user. In this case, the amount of the external force 108 that is transferred to the head of a user is reduced and the amount of impact force 108 of the head of a user with protective helmet 100 is reduced. In addition to reducing the amount of transferred forces of impact, protective helmet 100 can reduce the amount and/or the speed of relative change in position of the head of a user of protective helmet 100.

Protective helmet 100 serves also to reduce the amount of rotational force exerted by a force 108. Rotational forces can cause head and neck injuries. Thus, the reduction in the amount of rotational force transferred to the head of a user as a result of protective helmet 100 is a significant advantage over prior art helmets.

Upon impact of an impact force 108 with the outer layer 102 of protective helmet 100, connectors 106 can exert a force on inner layer 104 along the same line of impact but on the opposite side of the impact. The afforded displacement of impact allows for the reduction in the amount of force 108 transferred to the head of a user and/or allows for a reduction in the change of momentum of the head of a user. The afforded displacement of impact also allows for a decrease in the amount of acceleration or deceleration that the head of a user would otherwise experience.

In one preferred embodiment, the connectors 106 are arranged so as to afford the maximum reduction in the force of impact from any given angle. In this embodiment, the connectors 106 substantially surround the head of a user. In other words, to the extent that the inner layer 104 can be referenced as somewhat spherical, the connectors 106 would be connected to inner layer 104 along preferably greater than at least 180 degrees based upon any plane cross section taken through the center of the sphere defined by the inner layer 104. Preferably, connectors 106 are displaced in at least one complete hemisphere of the general sphere of the head of a user. Such sphere being divided into two equal hemispheres by any plane passing through its center.

In one preferred embodiment, the connectors 106 are disposed generally symmetrically. For example, the connectors 106 are generally symmetric along a plane of symmetry crossing through the center of the sphere generally formed by the protective helmet 100. In one preferred embodiment, this plane of symmetry is vertical and passes from the front portion 110 of the outer layer 102 through the center of the sphere to the rear portion 116 of the outer layer 102 of protective helmet 100.

Preferably, connectors 106 are the only connections between inner layer 104 and outer layer 102. In the event that there are other members connecting inner layer 104 to outer layer 102, such additional members are preferably configured so as to not reduce the energy absorption otherwise afforded by connectors 106.

As shown in FIG. 2A, when the force 108 exerted as shown in FIG. 2B is removed, the outer layer 102 and the inner layer 104 return to their orientation as shown in FIG. 2A. Likewise, connectors 106 preferably return to their original length and orientation. The connectors 106 preferably allow for repeated cycles of force absorption and recovery.

Preferably, the outer layer 102 is designed so as to ensure that all external forces impact outer layer 102 prior to engaging inner layer 104. Additional inner and or outer layers can be included with their own connectors. In these nested configurations the connectors between layers can be considered waves of force absorption. These waves can afford the same amount of force absorption as each other or serve as stepped up or stepped down amounts of force absorption. Such additional layers may afford greater absorption of rotational forces to thereby minimize user-perceived forces, such as neck loads and neck rotation. Each layer can be independently and selectively operable such that one layer is allowed, prohibited, phased, selected or timed to act under varying predetermined conditions or real-time conditions. In some scenarios, it may be preferable for the inner most wave of connectors to engage before an outer wave of connectors is engaged or vice versa.

Preferably, connectors 106 are connected directly between inner layer 104 and outer layer 102. In certain embodiments, it is preferred that the angle of contact of the connectors to the inner layer 104 and outer layer 102 be approximately 90 degrees.

Preferably for environments involving heat, outer layer 102 can include multiple openings 118 to allow air circulation, as shown in FIG. 4. Likewise, inner layer 104 can include multiple openings 120.

Figure 3:
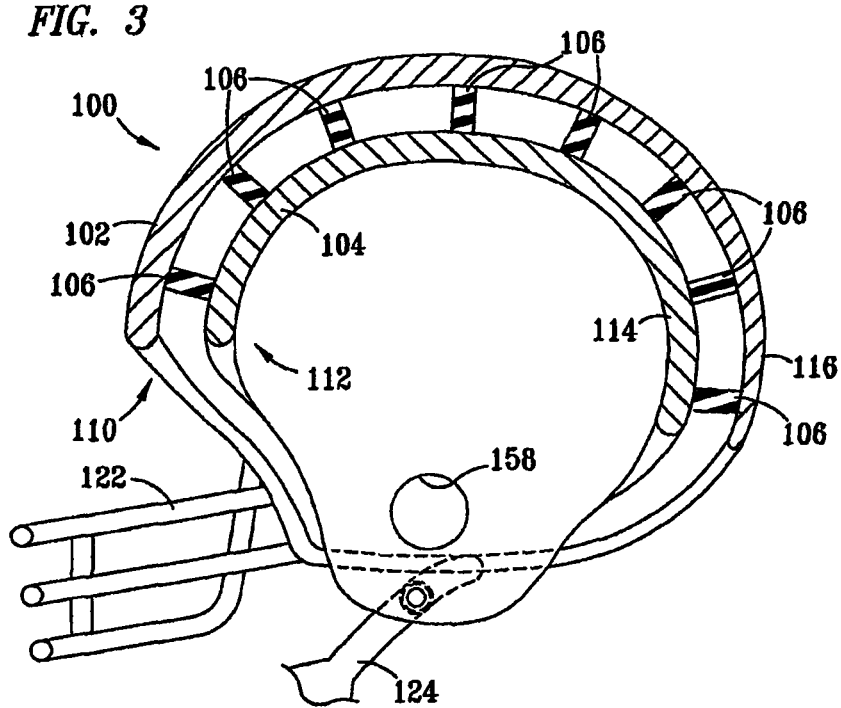
FIG. 3 is a cross-sectional view of a protective helmet according to the present invention as used for a football helmet showing the face guard connected to the outer layer and a chin strap connected to the inner layer, this embodiment can afford a reduction in the change in momentum or position of the head of a user that would otherwise occur.

As shown in FIG. 3, protective helmet 100, when used in certain application (e.g., as a football helmet), can include a face guard 122 and/or a chin strap 124. Face guard 122 is preferably secured to outer layer 102. Chin strap 124 is preferably connected to inner layer 104. In this embodiment, the head of a user is fixed relative to the inner layer 104 not only by means of the shape of the inner layer 104 but also by use of the chin strap 124. The outer layer 102 and the optional face guard 122 are allowed to move relative to inner layer 104, including as a result of an impact from a force 108 and/or an internal force caused by the head of a user.

Face guard 122 can be a clear, transparent material. Face guard 122 can afford a reduction in the amount of light (e.g., serve as a sun visor). Face guard 122 can be formed of a unitary, solid material or may include one or more openings or bars.

Contrary to the present invention, prior art football helmets undesirably use a chin strap connected to the outermost rigid layer that fixes the position of the head of the user to the relative position of the outermost rigid layer. One advantage of this embodiment of the present invention is afforded by the ability to connect a chin strap 124 to inner layer 104 to allow for movement of inner layer 104 relative to outer layer 102. In this embodiment, protective helmet 100 can be secured to the head of a user, but the outer layer 102 is not directly secured to the head of a user and thus can move relative to inner layer 104 in response to an impact force 108.

Outer layer 102 can be formed of a single shell of rigid or flexible material or can have multiple layers or zones of the same or different material. Outer layer 102 can be made of clear, transparent material.

Outer layer 102 can be made of a high force resistance material, including materials used in protective vests, including layers of very strong fiber (e.g., Kevlar) used to slow and deform a projectile, such as a bullet. The ability to deform a projectile affords the ability to spread its impact force over a larger portion of the outer layer 102. Protective helmet 100 can absorb the energy from the deformed projectile, bringing it to a complete stop or at least reducing its speed before it can completely penetrate the outer layer 102. The connectors 106 can reduce or eliminate the amount of force transferred to the head of a user. Inner layer 104 can also be made of such high force resistance material.

Inner layer 104 can be formed of a single shell of rigid or flexible material or can have multiple layers or zones of the same or different material. Inner layer 104 can include a rigid outer surface secured to the connectors 106 and a soft inner surface conforming to the head of a user. The inner surface of inner layer 104 may also include additional sizing layers, members or elements so as to afford a customized fit for a given user.

As shown in FIG. 4, outer layer 102 can include a padding member 126 on an inner surface 128. Padding member 126 can be in the form of a layer, matrix of material or a multitude of individual members.

As shown in FIG. 4, inner layer 104 can include a padding member 130 on an outer surface 132. Padding member 130 can be in the form of a layer, matrix of material or a multitude of individual members.

The distances between outer surface 132 of inner layer 104 and inner surface of outer layer 102 can be the same for the entire protective helmet 100. These distances can also be different for different regions of the helmet, including but not limited to, the front portions, rear portions, top portion and side portions.

The distances between the outer layer 102 and 104 and or the connectors 106, (including number, size, shape, location, amount of tension and type of material) can be altered for specific applications. For example, for construction environments, it may be preferable to have a greater distance between the outer layer 102 and inner layer 104 at the top region of protective helmet 100, which such distance is greater than would otherwise be desirable for other applications; and further to have stronger connectors 106 along the sides of the protective helmet 100. Moreover, even within a general application, such for football helmets, the distances between the outer layer 102 and inner layer 104 and or the connectors 106 (including number, size, shape, location, amount of tension and type of material) can be altered for specific players or positions. For example, it may be preferable to have a greater distance between the layers for the back of a helmet used for a quarterback, who may often be forced to fall backwards.

Padding members 126 and 130 can both be included. Padding members 126 and 130 can be oriented to contact to each other at a state of rest and/or to contact each other only under some impact force. Padding members 126 and 130 can be oriented to not contact at a state of rest and/or to not contact even under some impact force.

Preferably for certain environments, the inner layer 104 and the outer layer 102 are designed so as to afford an airflow to reduce what would otherwise be an undesirably high internal temperature of the protective helmet 100. Protective helmet 100 can include a cooling member 134, as shown in FIG. 4.

Preferably for certain environments, the inner layer 104 and the outer layer 102 are designed so as to afford a higher temperature than would otherwise be an undesirably low internal temperature of the protective helmet 100. Protective helmet 100 can include a heating member 136.

Preferably, protective helmet 100 can include a communication device 138. Communication device 108 can include one directional, bi-directional or multi-directional communications, including voice and visual communication. Communication device 138 could afford communication between a user of protective helmet 100 to any other person, such as another player, a coach or a commander.

Communication device 138 can be connected to a display 140. Display 140 can display any information or image, whether stored or communicated in real time.

The materials used for protective helmet 100 may differ depending upon the specific application. For example, protective helmet 100 as used for firefighters may require the use of more heat resistant materials that may in turn be heavier and or more costly than would be desirable for other applications.

In certain applications, the protective helmet 100 can include one or more motion sensors or accelerometers 142. Preferably, motion sensor 142 is connected to protective helmet 100 to detect movement occurring to or relative to the rear portions and or to the sides of protective helmet 100. Motion sensor 142 can be connected to display 140 and or communication device 138.

In certain applications, the protective helmet 100 can include a camera 144. Camera 144 can be connected to display 140 and or communication device 138. One or more cameras 144 can be mounted on protective helmet 100. Camera 144 can display a rear view to a user via display 140.

As shown in FIG. 5, protective helmet 100 can include one or more adjustors 146. Adjustor 146 allows for the increase and/or decrease in the amount of tension of one or more connectors 106. Adjustor 146 may also allow for a change in position of one or more connectors 106. Adjustor 146 can be formed of a threaded portion 152 having a channel 154 and a moveable portion 156. Moveable portion 156 can be adjusted so as to move a connector 106 through channel 154. Preferably, adjustor 146 is flush with the outer surface of outer layer 102.

Motion sensor 142 can be used to detect the speed, size, orientation and/or direction of impact of an incoming force 108. This information can be communicated to communication device 138 and/or to display 140. A light, signal or communication can be generated in advance, during and or after an impact so as to indicate an impending, ongoing or recent impact. Such a communication can also indicate whether an undesirable threshold has been exceeded so as to remove a player and/or to inspect protective helmet 100. Preferably, this information can be communicated to one or more adjustors 146 that can adjust connectors 106 in accordance with the information so as to maximize the amount of protection afforded by protective helmet 100. For example, if a small, fast moving object (e.g. a bullet) is detected, motion sensor 142 can detect the object communicate the information to the dynamic response system, which may include software, and cause adjustments in the connectors prior to and/or during impact so as to maximize force-absorption and minimize injury. Such a response may include increasing the tension on some or all of the connectors. This dynamic impact response system has many useful applications, including in military applications. Likewise, if a larger, slower moving object is detected the dynamic response system can respond accordingly, such as possibly by lessening the tension on some or all of the connectors. In certain scenarios, it may be desirable to increase the tension on some connectors and decrease the tension on others. This dynamic impact response system can be installed within protective helmet 100 and can be monitored and/or controlled locally or remotely by a local or remote computer. In addition, the impact information can be stored. The impact information can include the movement of connectors 106, outer layer 102 and inner layer 104. By assessing the information gathered, an angle of approach of force 108 may be determined. This angle is useful in detecting the location and source of the force 108, e.g., for determining the location of a sniper. The dynamic impact response system can include air bags or other explosive devices that can be responsively deployable and directionally targeted to an incoming projectile so as to counter, at least in part, the force of such projectile. The air bag itself can be made of high force resistance material, including materials used in protective vests, including layers of very strong fiber (e.g., Kevlar) used to slow and deform a projectile, such as a bullet.

Protective helmet 100 may also include sensors that monitor the acceleration and/or change in momentum and can communicate same to the dynamic impact response system. In this embodiment, protective helmet 100 communicates in real time and can be used in various applications, including boxing matches. In the boxing match application, a method for monitoring punch hits and force can be employed wherein the helmet monitors hits and force, communicates same to a computer, analysis of the information is performed and a report is communicated to a non-participant for observation and/or scoring purposes. In addition, the method can include determining whether the observed number and or amount of force experienced meets a certain predetermine value such that the match should be discontinued and or to declare a victor. Protective helmet 100 can respond in real time to an incoming impact force 108 by using sensors that communicate to connectors 106 to cause adjustments thereto. A power source, preferably one or more batteries, can be used and secured to protective helmet 100 and operably connected to the various preferred components disclosed herein through one or more electrical circuits as understood by one of skill in the art.

As shown in FIG. 5, protective helmet 100 may include a right side portion 148 and a left side portion 150. Right side portion 148 can be disposed over the right side of the head of a user. Left side portion 150 can be disposed over the left side of the head of a user. For certain applications, for example, where protective helmet 100 is used as a batting helmet for baseball, only one of the side portions 148 and 150 may be included. The inner layer 104 may include one or more openings 158 around the ear of the user.

In one embodiment, outer layer 102 can envelope most of the head of the user, including the top, sides, front and back of the head of a user; and inner layer 104 can envelope most of the head of the user, including the top, sides, front and back of the head of a user. The portion of inner layer 104 that extends over the face of a user can include multiple connectors 106 to improve the performance of the protective helmet 100 from rear impacts. In this embodiment, the front portions of both the outer layer 102 and the inner layer 104 are transparent. In another embodiment, one or more of the layers envelope less than most of the head of the user.

Prototype Test Results. Certain springs for a prototype were obtained from Lee Spring, Inc. Part Number LE 026B 01 M, Outside Diameter 0.188 inches; Wire Diameter 0.026 inches; Maximum Load 4.300 lb; Free Length 1.000 in; Rate 6.10 lb/in; Maximum Length 1.620 in; Initial Tension 0.500 lb; Material MW (music wire); Total Coils 26.4; Number of Coils 26.4; Finish ZINC PLATE AND BAKE PER ASTM B633. The outer layer of the prototype was a racing helmet and the inner layer was a child's batting helmet. The original padding of each was removed. Holes were drilled in the outer helmet and eye-hooks were screwed into the inner helmet. Extension springs were connected to the eye-hooks, extended and pulled through the holes in the outer helmet and secured in place by bolts disposed perpendicular to the longitudinal axis of the springs. A youth lacrosse shoulder pad was used as the padding for the inner helmet. A football helmet chin strap was used and was secured to the inner helmet. There were 24 extension springs used, each being under tension along their longitudinal axis. The helmet was tested at Wayne State University and outperformed a Riddell Revolution football helmet and a COTS Simpson NASCAR helmet (model: 8707141 SNS, size: 7¼) in certain categories. The helmets were tested using a Hybrid III ATD head and neck mounted to a linear trolley system. The head form was instrumented with three linear accelerometers, three angular rate sensors, and a 6-axis upper neck load cell. This instrumentation is capable of providing linear and angular acceleration data, as well as forces and moments in the upper neck of the Hybrid III. 8-channel SIMs and (DTS, Seal Beach, Calif.). The data were subsequently downloaded using TDAS control software. After testing, post-processing of the data was conducted using National Instruments DIAdem 2010, National Instruments (Austin, Tex.). Data processing included data filtering according to SAE J211-1, calculation of resultant head acceleration, head angular velocity, neck force, and neck moment. DIAdem crash analysis and mathematical functions were used to calculate Severity Index (SI), Head Injury Criterion (HIC), and peak angular acceleration. Five criteria were used to evaluate the severity of each impact: Head Injury Criteria (HIC), Severity Index (SI), Peak Angular Acceleration, Peak Resultant Upper Neck Load, and Peak Resultant Upper Neck Moment. For each of these criteria, as the value increases the risk of injury increases. After data processing, results were organized by each of the three impact locations and compared by the products tested. The prototype had lower values than the NASCAR helmet in the following categories: HIC in two impact locations (i.e. Side Impact Condition and Rear Impact Condition); SI in two of the impact locations (i.e. Side Impact Condition and Rear Impact Condition); Peak Angular Acceleration in all three impact locations; Upper Neck Load in the Side Impact Condition; and Upper Neck Moment in all three impact locations (i.e. Front Impact Condition, Side Impact Condition and Rear Impact Condition). In addition, the prototype had lower values than the football helmet in the following categories: Peak Angular Acceleration in the front impact location; and Upper Neck Load and Upper Neck Moment in all three impact locations (i.e. Front Impact Condition, Side Impact Condition and Rear Impact Condition).

Figure 7:
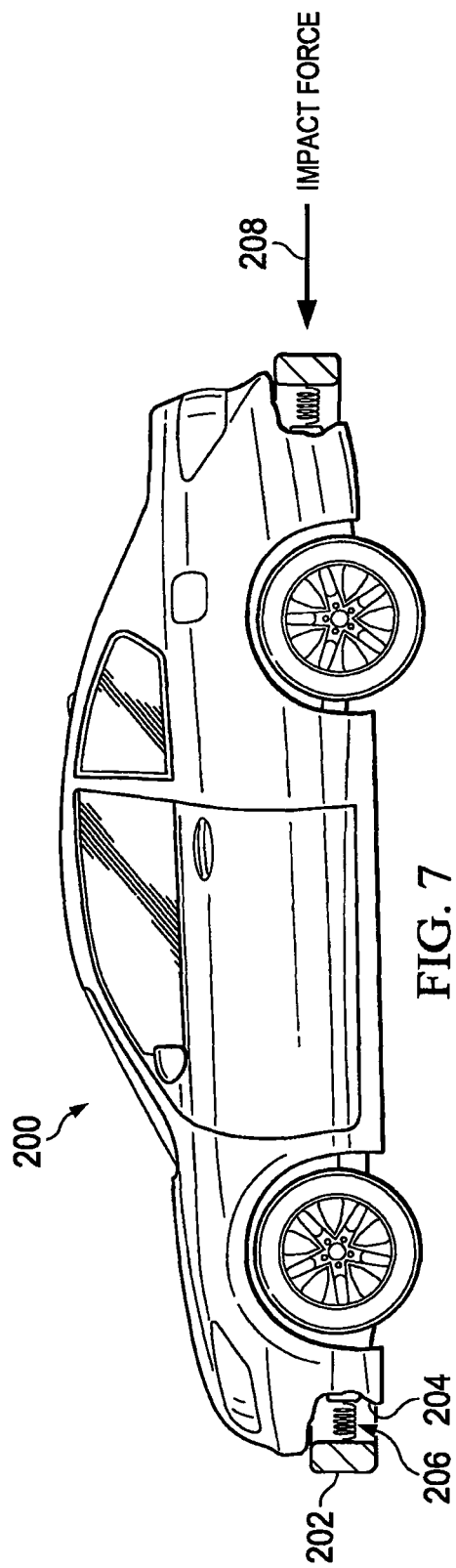
FIG. 7 is a cross-sectional view of a protective helmet according to the present invention as applied to automotive bumpers.

FIG. 7 depicts a protective member according to the present invention as applied to an automotive bumper 200. The bumper 200 includes an outer layer 202 and an inner layer 204 connected by multiple connectors 206, preferably comprising extension springs. The connectors 206 have a longitudinal axis being under tension along said longitudinal axis so as to absorb energy from an impact force 208 (e.g. from another vehicle or object) by resisting further tension along said longitudinal axis. During an impact, outer layer 202 and inner layer 204 are allowed to move relative to each other and reduce the amount of force from said impact that is transferred to the vehicle or automobile, thus reducing the amount impact force reaching the passenger or cargo. An impact to the front of the bumper 200 will be absorbed at least in part by the connectors 206 on the back of the bumper 200 and vice versa. In this way, the force of impact is transferred to the opposite side of the impact. Moreover, in the scenario in which an automobile is moving, during an impact the inner layer 204 is allowed to continue moving at least through part of the distance between the inner layer 204 and the outer layer 202 so as to decrease the rate of deceleration experienced by the passenger or cargo. In the scenario in which an automobile is stationary, during an impact the outer layer 202 is allowed to continue moving at least through part of the distance between the inner layer 204 and the outer layer 202 so as to decrease the amount of force experienced by the passenger or cargo. Bumper 200 may include connectors 206 in the front and back, or in relatively 360 degrees orientation. Bumper 200 may also be disposed to include connectors 206 only on the sides of the vehicle. A given vehicle can be configured to include one or more bumpers 200. For example, a front/back bumper can be used with a side/side bumper. In addition, bumper 200 can include nested layers, such as one or more additional outer or inner layers with their own connectors 206. Such a configuration can afford additional force absorption and also stepped force absorption, i.e. absorption that is greater than or less than the force absorption afforded by the first or outermost wave of connectors 206. Bumper 200 can be connected to the dynamic response system which can communicate impacts, including to a system that adjusts the amount of tension on connectors 206, adjusts the speed and positioning of the car and or deploys various safety mechanisms, such as air bags. In these embodiments, a force 208 can be managed while affording some continued movement of the passenger or cargo to decrease the rate of deceleration experienced. Connectors 206 may also be adjustable such that the amount of tension is adjusted depending upon the speed of the vehicle or the perceived speed of an approaching force 208. After an impact, inner and outer layers preferably return to the original relative orientation.

Figure 8:
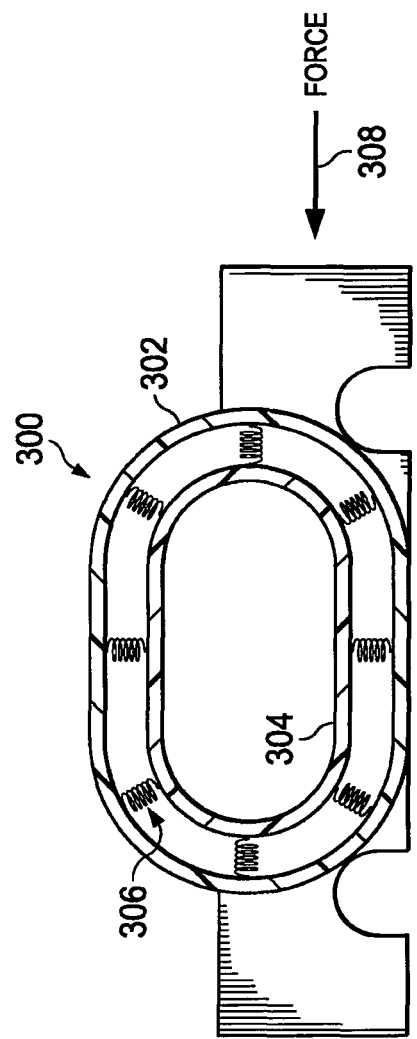
FIG. 8 is a cross-sectional view of a protective helmet according to the present invention as applied to a passenger cabin.

FIG. 8 is a cross-sectional view of a protective member according to the present invention as applied to a passenger cabin 300. Cabin 300 includes an outer layer 302 and an inner layer 304 connected by multiple connectors 306, preferably comprising extension springs. The connectors 306 have a longitudinal axis being under tension along said longitudinal axis so as to absorb energy from an impact force 308 (e.g. from another vehicle or object) by resisting further tension along their longitudinal axis. During an impact, outer layer 302 and inner layer 304 are allowed to move relative to each other and reduce the amount of force from said impact that is transferred to the cabin, thus reducing the amount impact force reaching the passenger and or cargo. An impact to the front of the cabin 300 will be absorbed at least in part by the connectors 306 on the back of the cabin 300 and vice versa. In this way, the force of impact is transferred to the opposite side of the impact. Moreover, in the scenario in which an automobile is moving, during an impact the inner layer 304 is allowed to continue moving at least through part of the distance between the inner layer 304 and the outer layer 302 so as to decrease the rate of deceleration experienced by the passenger or cargo. In the scenario in which an automobile is stationary, during an impact the outer layer 302 is allowed to continue moving at least through part of the distance between the inner layer 304 and the outer layer 302 so as to decrease the amount of force experienced by the passenger or cargo. Cabin 300 may include connectors 306 in the front and back, or in relatively 360 degrees or omni-directional orientations. The longitudinal axis of the connectors are preferably oriented such that a line extending from the longitudinal axis would pass through the center of the Cabin 300. Cabin 300 may also be disposed to include connectors 306 only on the sides of the vehicle. Cabin 300 can also include connectors in the top or bottom areas so as to absorb forces caused by road conditions. A given vehicle can be configured to include one or more cabins 300. For example, a cabin 300 may be used for each passenger. In addition, cabin 300 can include nested layers, such as one or more additional outer or inner layers with their own connectors 306. Such a configuration can afford additional force absorption and also stepped force absorption, i.e. absorption that is greater than or less than the force absorption afforded by the first or outermost wave of connectors 306. Cabin 300 can be connected to the dynamic response system which can communicate impacts, including to a system that adjusts the amount of tension on connectors 306, adjusts the speed and positioning of the car and or deploys various safety mechanisms, such as air bags. In these embodiments, a force 308 can be managed while affording some continued movement of the passenger or cargo to decrease the rate of deceleration experienced. Connectors 306 may also be adjustable such that the amount of tension is adjusted depending upon the speed of the vehicle or the perceived speed of an approaching force 308 or of perceived road conditions. After an impact, inner and outer layers preferably return to the original relative orientation. Cabin 300 can also be used in other applications such as for an airplane or motorcycle.

Figure 9:
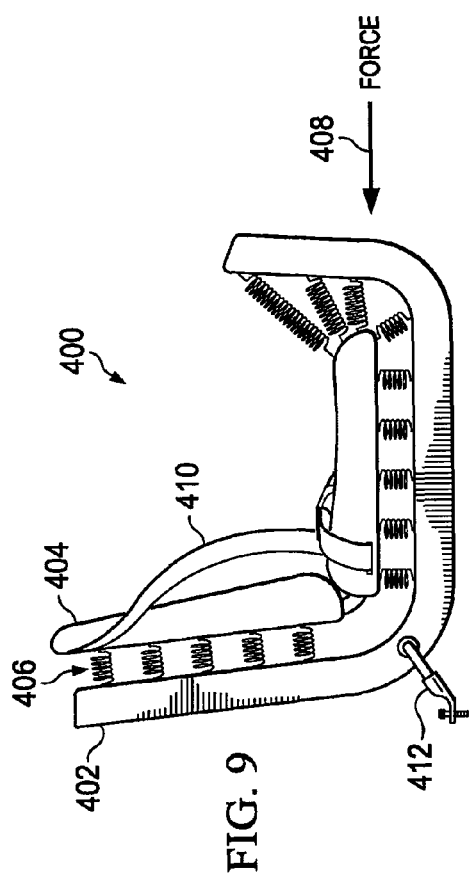
FIG. 9 is a cross-sectional view of a protective helmet according to the present invention as applied to a car seat.

FIG. 9 is a cross-sectional view of a protective member according to the present invention as applied to a car seat 400. Car seat 400 includes an outer layer 402 and an inner layer 404 connected by multiple connectors 406, preferably comprising extension springs. Outer layer 402 and inner layer 404 preferably envelope the user as much as feasible to afford omni-directional force absorption. The goal of omni-directional force absorption can also be accomplished by adjusting the angles of various connectors. The outer layer 402 is preferably rigidly secured to the seat of a car such as by traditional locking members connected to the seat frame. Inner layer 404 is thus allowed to move relative to outer layer 402 and to the car with force absorption being performed by the connectors 406. The connectors 406 have a longitudinal axis being under tension along said longitudinal axis so as to absorb energy from an impact force 408 (e.g. from another vehicle or object) by resisting further tension along their longitudinal axis. A child can be secured to inner layer 404 by straps 410. Outer layer 402 can be secured to a seat of a car by anchors 412. During an impact, outer layer 402 and inner layer 404 are allowed to move relative to each other and reduce the amount of force from said impact that is transferred to the child, thus reducing the amount impact force reaching the child or infant. An impact to the front of a vehicle containing the car seat 400 will be absorbed at least in part by the connectors 406 on the back of the car seat 400 and vice versa. In this way, the force of impact is transferred to the opposite side of the impact. Moreover, in the scenario in which an automobile is moving forward and encounters a head-on force, during impact the inner layer 404 is allowed to continue moving at least through part of the distance between the inner layer 404 and the outer layer 402 so as to decrease the rate of deceleration experienced by the infant, child or other passenger. In the scenario in which an automobile is stationary and encounters an impact, during impact the outer layer 402 is allowed to continue moving at least through part of the distance between the inner layer 404 and the outer layer 402 so as to decrease the amount of force experienced by the passenger. Car seat 400 may include connectors 406 in the front and back, or in relatively 360 degrees or omni-directional orientations. Car seat 400 may also be disposed to include connectors 406 only on the sides of the car seat. Car seat 400 can also include connectors in the top or bottom areas so as to absorb forces caused by road conditions. In addition, car seat 400 can include nested layers, such as one or more additional inner or outer layers with their own connectors 406. Such a configuration can afford additional force absorption and also stepped force absorption, i.e. absorption that is greater than or less than the force absorption afforded by the first or outermost wave of connectors 406. Car seat 400 can also include tethers between layers that are not under tension but that are engaged so as to limit the relative travel of the layers. Car seat 400 can be connected to the dynamic response system which can communicate impacts, including to a system that adjusts the tension on connectors 406 and or deploys various safety mechanisms, such as air bags. In these embodiments, a force 408 can be managed while affording some continued movement of the infant or child to decrease the rate of deceleration experienced. Connectors 406 may also be adjustable such that the amount of tension is adjusted depending upon the speed of the vehicle or the perceived speed of an approaching force 408 or of perceived road conditions. After an impact, inner and outer layers preferably return to the original relative orientation.

Figure 10:
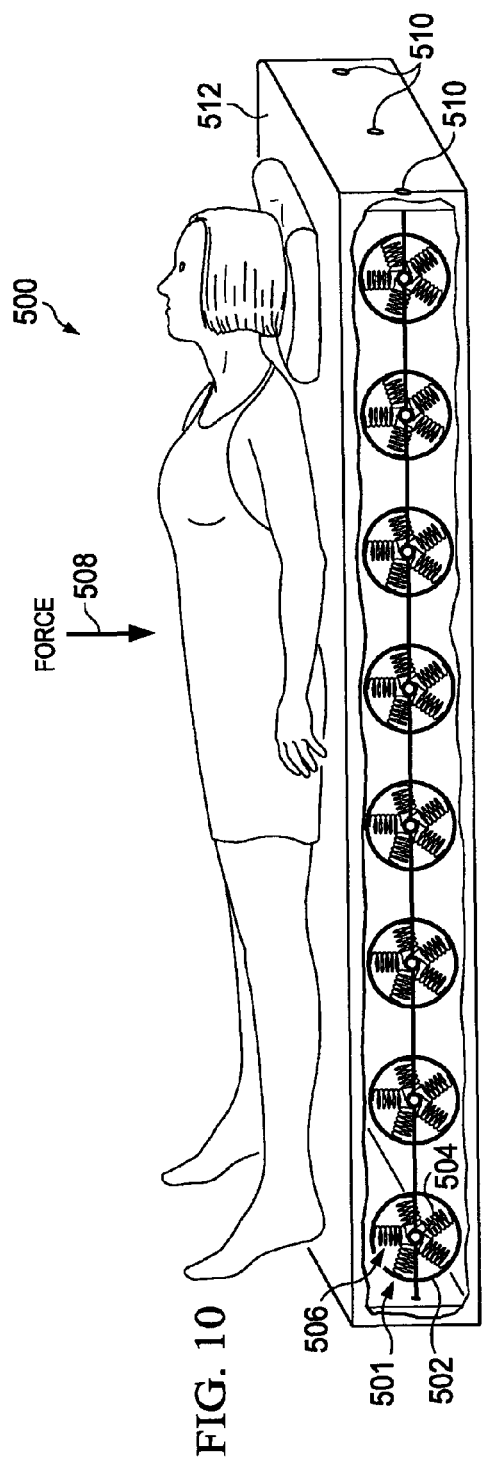
FIG. 10 is a cross-sectional view of a protective helmet according to the present invention as applied to a bed.

FIG. 10 is a depiction of a protective member according to the present invention as applied to a bed 500. Bed 500 includes one or more force absorption members 501 having an outer layer 502, an inner layer 504 and connectors 506. The connectors 506 have a longitudinal axis and are under tension along their longitudinal axis. Connectors 506 can be extension springs. Members 501 afford relative movement between outer layer 502 and inner layer 504. Bed 500 can absorb a force 508 of a user, including as a result of the weight of the body of a person sleeping on bed 500. The multiple members 501 can be connected to a support member (e.g. horizontal bar) 510 that extends through the members 501, preferably through the center of the inner layer 504 rigidly supporting the member 501 but allowing relative movement of outer layer 502 so as to absorb the weight of a user as a result of further tension being placed on the connectors opposite the side of the user, i.e. closer to the floor. In this configuration, the weight of a user is absorbed by the connectors on the opposite side of the user, i.e. towards to floor. Thus, the weight of the user causes outer layer 502 to move towards the floor whereas the inner layer 504 remains relatively fixed in relation to the floor. When the user leaves, outer layer 502 preferably returns to its original orientation relative to inner layer 504. A preferred configuration of bed 500 affords multiple members 501 disposed such that the longitudinal axis of the connectors 506 are perpendicular to the longitudinal axis of the horizontally disposed bar 510. Members 501 are preferably configured so as to afford various zones of differing firmness. Upon the user leaving bed 500, the connectors preferably return outer layer 502 to its original orientation relative to inner layer 504. The cross-sections of the members 501 can be of any shape including circular, oval, square or rectangular and include one or more connectors in both the upper and lower hemispheres. Horizontal bar 510 preferably affords adjustability to the tension of connectors 506. Multiple horizontally disposed bars 510 can be used, each containing one more force absorption members 501. Bed 500 can allow adjustment to connectors 506 depending upon the weight and size of the user and or sleep patterns. The connectors 506 can have varying tension depending on the zone and can be adjustable and replaceable. Bed 500 can include multiple layers of members 501, which can appear in a single layer or can replace one or more of the traditional layers: mattress or box spring (which comprise compression springs). In addition, bed 500 can include nested layers, such as one or more additional inner or outer layers within one or more of the members 501 that include their own connectors 506. Such a configuration can afford additional force absorption and also stepped force absorption, i.e. absorption that is greater than or less than the force absorption afforded by the first or outermost wave of connectors 506. For example, the outermost wave of connectors can be configured to absorb a few pounds of force along a slight distance whereas a first inner wave of connectors can be configured to absorb a much greater amount of force over a longer distance; or vice versa. In one scenario, the first wave is fully engaged and reaches a force absorption stopping point before the second wave is engaged. Traditional bedding layers 512 can also be included, such as a cushion or foam layer on top of the bed 500. The number and positioning of members 501 can be varied based upon the size of the bed, user preference, number of sleepers, the number of connectors, orientation of connectors, the properties of the connectors 506 and the amount of tension on connectors 506. The upper most shape of the outer layer 502 can be flat or curved. Moreover, one or more horizontal bars 510 can be used in parallel, angled and or perpendicular orientation to each other and or the user. In addition, bed 500 can be coupled to a computer containing software that receives inputs, such as the height and weight of a user, that then causes adjustments to the members 501 that are tailored to a given user.

Those of skill in the art understand that various changes and modifications can be made to these preferred embodiments without departing from the invention disclosed and claimed herein. All such changes and modifications are intended to be covered by the following claims:

What is claimed is:

1. A protective helmet for protecting the head of a user comprising:
   an outer layer;
   an inner layer connected to said outer layer by multiple connectors wherein each said connector has a longitudinal axis;
   each of said connectors comprising an extension spring being under tension along said longitudinal axis;
   wherein said connectors allow said outer layer and said inner layer to move relative to each other and reduce the amount of force from said impact that is transferred to the head of a user.

2. The protective helmet of claim 1 wherein said connectors can absorb energy from an impact force by resisting further tension along said longitudinal axis as said connector is stretched generally along said longitudinal axis.

3. The protective helmet of claim 1 wherein said connectors can absorb energy from an impact by resisting further tension along their longitudinal axis generally on the opposite side of the protective helmet than the side of impact.

4. The protective helmet of claim 1 further comprising a chin strap connected to said inner layer.

5. The protective helmet of claim 1 further comprising a face guard connected to said outer layer.

6. The protective helmet of claim 1 wherein the amount of neck load experienced by a user is reduced as a result of the movement of said springs than would otherwise occur.

7. The protective helmet of claim 1 wherein the amount of head rotation experienced by a user is reduced as a result of the movement of said springs than would otherwise occur.

8. The protective helmet of claim 1 further comprising an inner surface of said outer layer having a sizing layer so as to afford a customized fit for a given user.

9. The protective helmet of claim 1 further comprising an outer surface of said inner layer having a padding member.

10. The protective helmet of claim 1 further comprising one or more of the following: a cooling member; a heating member; a communication device; a power source; a display; a motion sensor; an air bag or a camera.

11. The protective helmet of claim 1 wherein said connectors differ along their length in their ability to absorb the force of an impact.

12. The protective helmet of claim 1 further comprising at least one adjustor to adjust the amount of tension of said connector.

13. The protective helmet of claim 1 further comprising a dynamic impact response system comprising a motion sensor to detect the speed, size, orientation and/or direction of impact of an incoming object, a communication device in communication with one or more adjustors that can adjust the connectors in accordance with the information so as to maximize the amount of protection afforded by protective helmet.

14. The protective helmet of claim 1 wherein said outer layer comprises a rigid shell.

15. The protective helmet of claim 1 wherein said connectors allow for said outer layer and said inner layer to move relative to each other so as to afford a reduction in the amount of rotational force that would otherwise occur.

16. The protective helmet of claim 1 wherein said outer layer is comprised of high force resistance material so as to afford the ability to slow or stop bullets or other objects.

* * * * *